United States Patent
Nguyen et al.

(10) Patent No.: US 12,456,502 B2
(45) Date of Patent: Oct. 28, 2025

(54) GENERATING SEMI-SOFT BIT DATA DURING CORRECTIVE READ OPERATIONS IN MEMORY DEVICES

(71) Applicant: Micron Technology, Inc., Boise, ID (US)

(72) Inventors: Phong Sy Nguyen, Livermore, CA (US); Patrick R. Khayat, San Diego, CA (US); Jeffrey S. McNeil, Nampa, ID (US); Dung Viet Nguyen, San Jose, CA (US); Kishore Kumar Muchherla, San Jose, CA (US); James Fitzpatrick, Laguna Niguel, CA (US)

(73) Assignee: Micron Technology, Inc., Boise, ID (US)

( * ) Notice: Subject to any disclaimer, the term of this patent is extended or adjusted under 35 U.S.C. 154(b) by 218 days.

(21) Appl. No.: 18/198,623

(22) Filed: May 17, 2023

(65) Prior Publication Data
US 2024/0071435 A1 Feb. 29, 2024

Related U.S. Application Data

(60) Provisional application No. 63/402,318, filed on Aug. 30, 2022.

(51) Int. Cl.
*G11C 7/00* (2006.01)
*G11C 7/10* (2006.01)

(52) U.S. Cl.
CPC .......... *G11C 7/1069* (2013.01); *G11C 7/1057* (2013.01); *G11C 7/106* (2013.01)

(58) Field of Classification Search
CPC ...................................................... G11C 7/106
USPC .......................................................... 365/205
See application file for complete search history.

(56) References Cited

U.S. PATENT DOCUMENTS

| | | | |
|---|---|---|---|
| 2022/0130466 A1* | 4/2022 | Bazarsky | G11C 16/3427 |
| 2023/0298685 A1* | 9/2023 | Shimizu | G11C 8/08 365/189.05 |

\* cited by examiner

*Primary Examiner* — Hoai V Ho
(74) *Attorney, Agent, or Firm* — Lowenstein Sandler LLP

(57) ABSTRACT

Systems and methods are disclosed including a memory device comprising a memory array and control logic, operatively coupled with the memory array. The control logic can perform operations comprising causing a read operation to be initiated with respect to a set of target cells of the memory array; obtaining, for a respective group of adjacent cells, respective cell state information; performing a set of strobe reads on the set of target cells; and generating, for a target cell of the set of target cells, semi-soft bit data based on the respective cell state information of the respective group of adjacent cells and on data obtained from a first strobe read and a second strobe read of the set of strobe reads performed on the target cell.

20 Claims, 10 Drawing Sheets

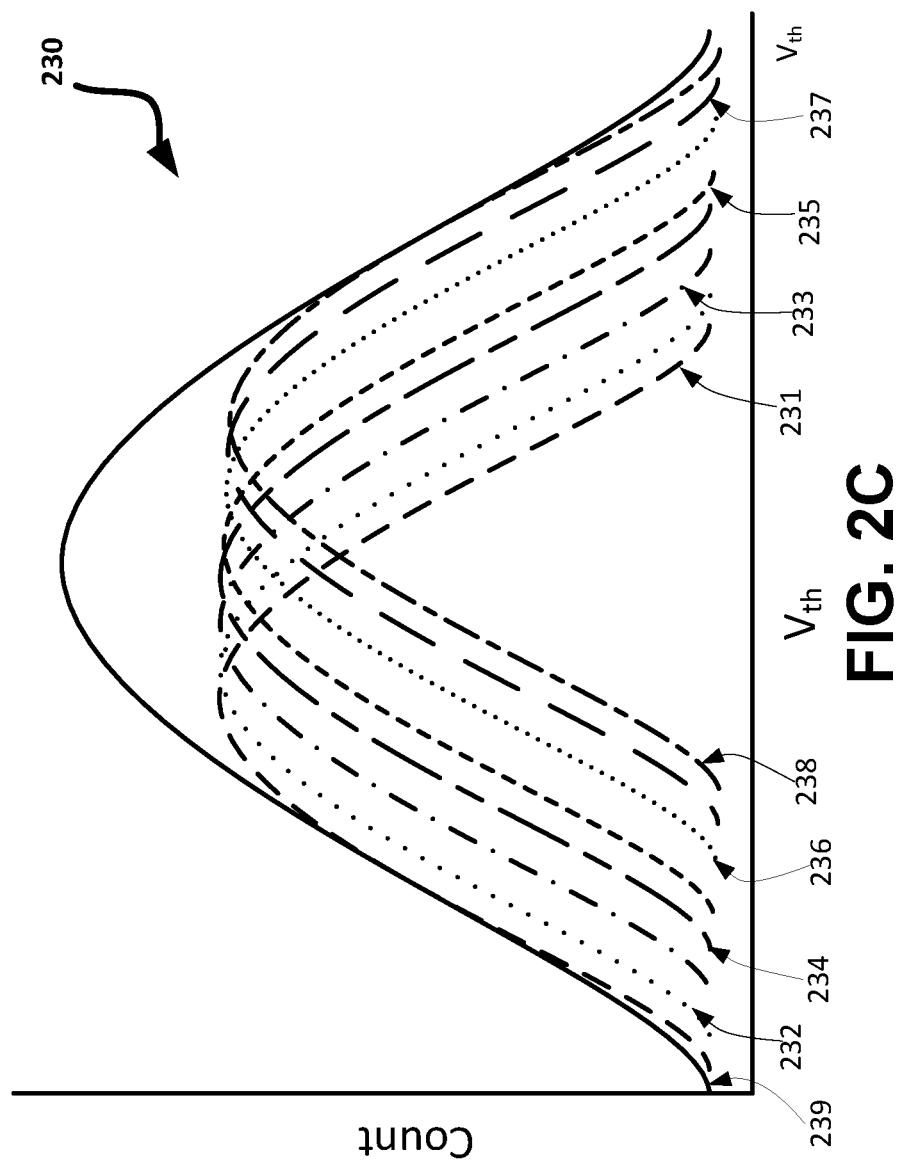

| Latch No. | Bitline 0 | Bitline 1 | Bitline 2 | Bitline 3 | Bitline 4 | ... | Bitline m |
|---|---|---|---|---|---|---|---|
| 0 | Aggressor S1 | Aggressor S3 | Aggressor S4 | Aggressor S2 | Aggressor S4 | ... | Aggressor S1 |
| 1 | Aggressor S1 | Aggressor S3 | Aggressor S4 | Aggressor S2 | Aggressor S4 | ... | Aggressor S1 |
| 2 | Bit Read with $s_1$ | Bit Read with $s_3$ | Bit Read with $s_4$ | Bit Read with $s_2$ | Bit Read with $s_4$ | ... | Bit Read with $s_1$ |
| 3 | XNOR (bit read with $s_1$ and $s_2$) | XNOR (bit read with $s_2$ and $s_4$) | XNOR (bit read with $s_3$ and $s_4$) | XNOR (bit read with $s_1$ and $s_3$) | XNOR (bit read with $s_3$ and $s_4$) | ... | XNOR (bit read with $s_1$ and $s_2$) |

FIG. 5B

GENERATING SEMI-SOFT BIT DATA DURING CORRECTIVE READ OPERATIONS IN MEMORY DEVICES

RELATED APPLICATIONS

This application claims the benefit of U.S. Provisional Application No. 63/402,318, filed Aug. 30, 2022, the entire content of which is hereby incorporated by reference.

TECHNICAL FIELD

Embodiments of the disclosure relate generally to memory sub-systems, and more specifically, relate to generating semi-soft bit data during corrective read operations in memory devices

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2C illustrates an example threshold voltage distribution and its sub distributions, in accordance with some embodiments of the present disclosure.

FIG. 5B illustrates an example case for a one-bit semi soft, two-bit corrective read, in accordance with some embodiments of the present disclosure.

DETAILED DESCRIPTION

Figure 1A:
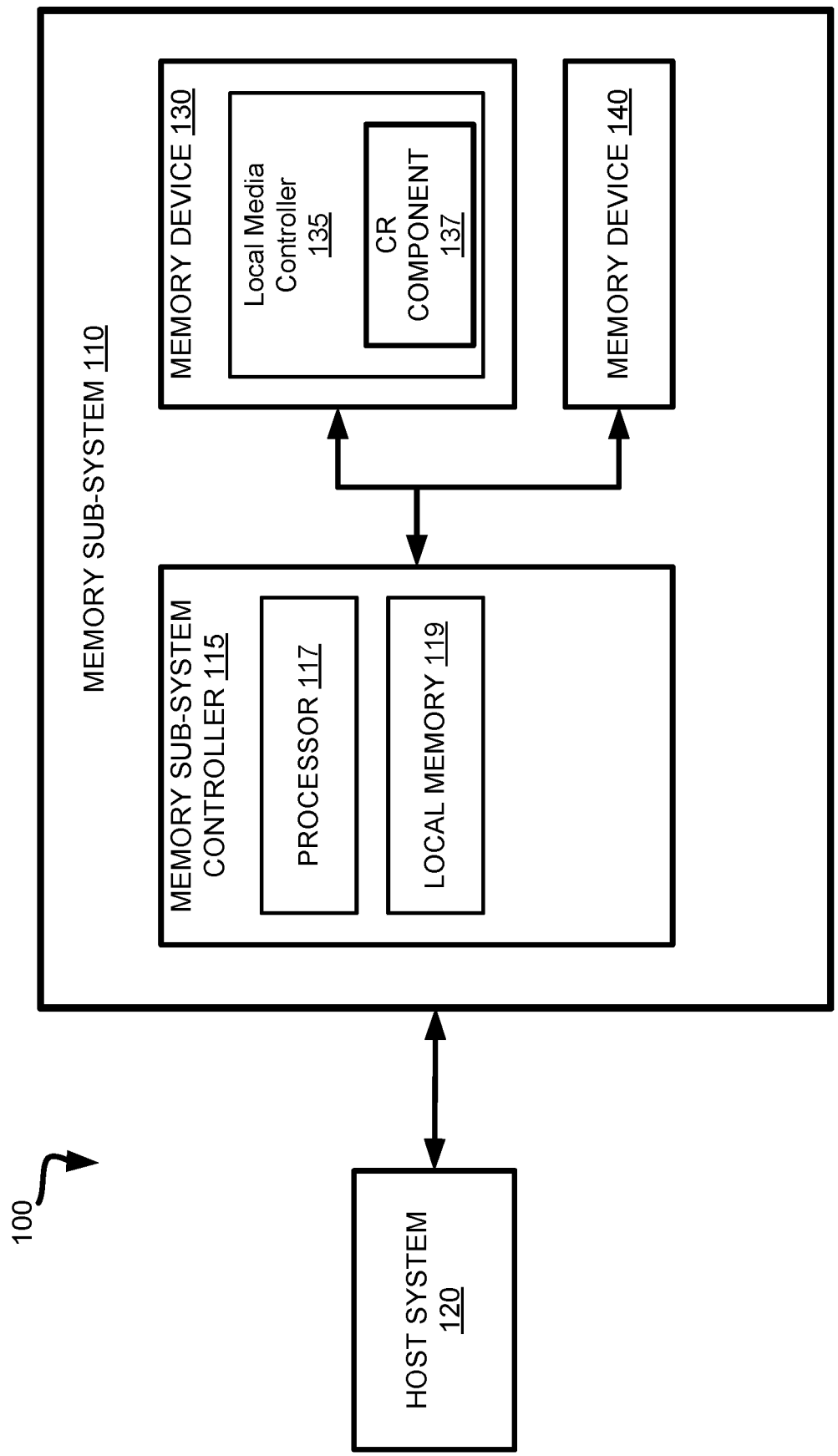
FIG. 1A illustrates an example computing system that includes a memory sub-system in accordance with some embodiments of the present disclosure.

Aspects of the present disclosure are directed to generating semi-soft bit data during corrective read operations in memory devices. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane includes a set of physical blocks. Each block includes a set of pages. Each page includes a set of memory cells ("cells"). A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device includes multiple memory cells arranged in a two-dimensional or three-dimensional grid. Memory cells are formed on a silicon wafer in an array of columns connected by conductive lines (also hereinafter referred to as bitlines) and rows connected by conductive lines (also hereinafter referred to as wordlines). A wordline can refer to a conductive line that connects control gates of a set (e.g., one or more rows) of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. In another example, the memory device can include multiple access line driver circuits and power circuits that can be shared by the planes of the memory device. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_t$ (also referred to as the "threshold voltage") such that the source-drain electric current is low for the control gate voltage ($V_{CG}$) being below the threshold voltage, $V_{CG} < V_t$. The current increases substantially once the control gate voltage has exceeded the threshold voltage, $V_{CG} > V_t$. Because the actual geometry of the electrodes and gates varies from cell to cell, the threshold voltages can be different even for cells implemented on the same die. The cells can, therefore, be characterized by a distribution P of the threshold voltages, $P(Q,V_t)=dW/dV_t$, where dW represents the probability that any given cell has its threshold voltage within the interval $[V_t, V_t+dV_t]$ when charge Q is placed on the cell.

A memory device can exhibit threshold voltage distributions $P(Q,V_t)$ that are narrow compared with the working range of control voltages tolerated by the cells of the device. Accordingly, multiple non-overlapping distributions $P(Q_k, V_t)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_t$ of the cell resides. Specifically, the read operation can be performed by comparing the measured threshold voltage $V_t$ exhibited by the memory cell to one or more reference voltage levels corresponding to known valley margins (e.g., centers of the margins) of the memory device.

One type of cell is a single level cell (SLC), which stores 1 bit per cell and defines 2 logical states ("states") ("1" or "L0" and "0" or "L1") each corresponding to a respective $V_t$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "00" or "L2" and "01" or "L3") each corresponding to a respective $V_t$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "100" or "L2", "000" or "L3", "010" or "L4", "011" or "L5", "001" or "L6", and "101" or "L7") each corresponding to a respective $V_t$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0111". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A valley margin can also be referred to as a read window. For example, in a SLC cell, there is 1 read window that exists with respect to the 2 $V_t$ distributions. As another example, in an MLC cell, there are 3 read windows that exist with respect to the 4 $V_t$ distributions. As yet another example, in a TLC cell, there are 7 read windows that exist with respect to the 8 $V_t$ distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

Cells of a memory array that are selected to be read during a read operation can be referred to target cells connected to a target wordline. The target cells can neighbor adjacent cells connected to at least one wordline neighboring the target wordline ("adjacent wordline"). For example, the at least one adjacent wordline can be a single wordline neighboring the target wordline or a pair of wordlines neighboring the target wordline. Illustratively, the target wordline can be referred to as an n-th wordline ($WL_n$), and the at least one adjacent wordline can include at least one of adjacent wordline n−1 ($WL_{n-1}$) or adjacent wordline n+1 ($WL_{n+1}$). For example, in a 3D memory device, the set of adjacent wordlines can include a wordline located directly above the target wordline and/or a wordline located directly below the target wordline.

Each target cell has a respective group of adjacent cells. Each group of adjacent cells includes at least one cell that neighbors its respective target cell (e.g., one cell connected to $WL_{n-1}$ and/or one cell connected to $WL_{n+1}$). More specifically, each target cell can be connected to the same bitline as each cell of the respective group of adjacent cells, such that the target cell and the cells of the respective group of adjacent cells are within the same string. Accordingly, each group of adjacent cells can include a single adjacent cell, or a pair of adjacent cells connected to a same bitline as a respective target cell.

A read can include a prologue phase during which a controller activates voltage pumps (e.g., causes voltage pumps to be turned on) and loads information for the read operation, a strobe phase in which a number of strobes are performed, and an epilogue phase during which the controller causes the cells to discharge, deactivates the voltage pumps (e.g., causes the voltage pumps to be turned off) and causes the memory device to return to an idle or standby state (e.g., depending on the state of the CE #signal). A strobe refers to a read performed at a particular read level offset (e.g., by applying the read level offset to a base read level). For example, for a 3 strobe page type, a 3 strobe read can be performed during the strobe phase.

Cell-to-cell interference may exist in a memory array between the target cells and their respective groups of adjacent cells. Cell-to-cell interference can lead to lateral charge migration and $V_t$ distribution shift. Cell-to-cell interference, in addition to intrinsic charge loss, can further lead to a widening of $V_t$ distributions. The $V_t$ distribution widening can cause RWB degradation, which can negatively affect memory device reliability. For example, RWB degradation can lead to an increase in the number of errors (e.g., bit errors) and/or error rate (e.g., bit error rate (BER)).

One mechanism to compensate for the effects of cell-to-cell interference and/or intrinsic charge loss is corrective read. Generally, a corrective read operation is performed to read each target cell using an appropriate read level offset that accounts for the cell-to-cell inference, lateral charge migration and/or intrinsic charge loss caused by the respective group of adjacent cells. The read level offset can be applied with respect to a center read level. For example, the center read level can be located within a valley between target cell $V_t$ distributions.

To implement a corrective read operation, a controller can, for each group of adjacent cells, obtain cell state information for each cell of the group of adjacent cells. The cell state information obtained from the adjacent cells can be referred to as aggressor cell state data. The cell state information for a cell reflects the logical level (e.g., L0-Ln, where n is the total number of logical levels supported) of the cell. For example, if a cell is an SLC cell, the cell state information can reflect whether the cell is in the L0 state or the L1 state. As another example, if the cell is a TLC cell, the cell state information can reflect which of the states L0-L7 that the cell is in. The cell state information for a cell can be obtained by identifying the state of the cell.

To identify the state of the cell, the controller can cause a read voltage to be applied the cell (e.g., gate electrode of the cell) and determine whether the read voltage activates (e.g., turns on) the cell. If the read voltage activates the cell, this indicates that the read voltage is greater than or equal to the $V_t$ of the cell. Additional read voltage(s) may be applied to the cell to determine whether the cell is in a lower state. If the read voltage does not activate the cell, this means that the read voltage is less than the $V_t$ of the cell, and that the cell is in a higher state. Additional read voltage(s) may be applied until the cell is activated. For each group of adjacent cells, the controller can store the cell state information for each cell of the group of adjacent cells in a respective page buffer (e.g., page cache). Each page buffer can be connected to a respective group of adjacent cells via a bitline.

A page cache (or buffer) is a circuit block comprising a number of memory elements and additional circuitry. Each page cache can be coupled to a bitline and used to latch data sensed from the memory array during a read operation, and to store data to be programmed into the memory array (e.g., the page cache stores data read from the memory array, or host data to be written to the memory array). The page cache includes static memory elements (e.g., latches), such as a primary data cache (PDC) and a secondary data cache (SDC). The PDC holds data that is used to keep the bit line at a voltage level sufficient to shift a threshold voltage of a memory cell during programming, or to sense the data from a bit line during a read operation. The SDC is a memory element accessible to the host system and is used as a data read/write buffer. The PDC and SDC are independent from one another. The page cache can further include a sense amplifier to read data from memory cells, and dynamic memory elements.

In some embodiments, the cell state information for each cell of a group of adjacent cells is 1-bit information. For example, obtaining the 1-bit cell state information can involve applying a single strobe read to each cell of the group of adjacent cells. If the group of adjacent cells includes a single cell (e.g., a cell connected to one of the adjacent wordlines $WL_{n-1}$ and $WL_{n+1}$), then the stored cell state information is 1 bit in total. The 1-bit stored cell state information can be used to implement 1-bit corrective read (1BCR). If the group of adjacent cells includes a pair of cells (e.g., cells connected to the adjacent wordlines $WL_{n-1}$ and $WL_{n+1}$), then the stored cell state information is 2 bits in total. The 2 bit stored cell state information can be used to implement a "1-bit 2-sided" version of 2-bit corrective read (2BCR).

In some embodiments, the cell state information for each cell of a group of adjacent cells is 2-bit information. For example, obtaining the 2-bit cell state information can involve applying a three strobe read to each cell of the group of adjacent cells. If the group of adjacent cells includes a single adjacent cell (e.g., a cell connected to one of the adjacent wordlines $WL_{n-1}$ and $WL_{n+1}$), then the stored cell state information is 2 bits in total. The 2 bit stored cell state information can be used to implement a "2-bit 1-sided" version of 2BCR. If the group of adjacent cells includes a pair of cells (e.g., cells connected to the adjacent wordlines $WL_{n-1}$ and $WL_{n+1}$), then the stored cell state information is 4 bits in total. The 4 bit stored cell state information can be used to implement 4-bit corrective read (4BCR).

In some embodiments, the target cells can then be scanned by performing a "hard" strobe generally in the middle of a valley between two threshold voltage distributions, which is a standard read operation. The reliability of this standard read can then be checked by employing a separate pair of "soft" strobes, one soft strobe to each side of the hard strobe to determine which bits are low confidence or high confidence. For example, the soft two-strobe read can be a single bit soft bit read (SBSBR). The bit information obtained by comparing the $V_t$ values of cells to integral reference voltages may be referred to as "hard bits." Additional information obtained by comparing the $V_t$ values of the cells to fractional reference voltages can be referred to as "soft bits." For example, determining that the $V_T$ of a cell lies between a voltage $V_1$ and a voltage $V_2$ provides hard bit information, and determining that the $V_T$ of the cell lies between $V_1$ and $V_{1.5}$ or $V_{1.5}$ and $V_2$ provides soft bit information. Illustratively, a soft bit can be a logical "1" for low fractional reference voltages and can be a logical "0" for high fractional reference voltages. For example, determining that the $V_t$ of the cell is between $V_1$ and $V_{1.5}$ can result in obtaining a soft bit of "1", determining that the $V_t$ of the cell is between $V_{1.5}$ and $V_2$ can result in obtaining a soft bit of "0". Soft bits can improve error correction code (ECC) capability (e.g., the ECC capability of an ECC decoder). For example, soft bits can be used to determine hard bit reliability. As another example, soft bits can be used to determining which hard bits to correct when there may be ambiguity.

The information obtained from the soft strobes can be passed through a log-likelihood ratio (LLR) operator, for example, used as a part of an error correction operation to determine whether to perform an error correction or to refresh the data. For these scans, however, each read that is checked by the memory sub-system controller requires two reads in these memory devices, the hard strobe and the pair of soft strobes. This existing practice is inefficient, takes significant overhead in performing two separate reads, and thus drives up memory access latency, reducing quality-of-service.

Aspects of the present disclosure address the above and other deficiencies by generating semi-soft bit data for performing corrective reads in memory devices. The various embodiments described herein facilitate generating the semi-soft bit data as a byproduct of existing corrective read operations used to obtain hard bits, thus reducing system latency by reducing the rate of performing additional corrective read operations to obtain soft bits. In general, in some embodiments, the local media controller of the memory device can, in response to a read command (referencing a target set of cells) experiencing a read error, reserve one or more latches of each page buffer for storing cell state information relating to adjacent cells (referred to as aggressor data), reserve a latch of each page buffer for storing hard bits related to the target cells, and reserve one or more latches of each page buffer for storing semi-soft bit data. The memory sub-system can initiate a corrective read. During the corrective read, the local media controller can obtain aggressor data related to the target set of cells and store the aggressor data in the one or more corresponding latches. The aggressor data can include the cell state information of the adjacent cells.

The number of possible aggressor cells states can indicate the number of different strobe reads to be performed on the target cells. For example, the number of aggressor cell states $(S_1, S_2, \ldots, S_N)$ can correspond to the number of strobe reads in the set (e.g., $s_1, s_2, \ldots, s_N$). In an example where the adjacent cell data can be in one of four states ($S_1, S_2, S_3, S_4$), a set of four strobe reads ($s_1, s_2, s_3, s_4$) can be used on the target cells.

The local media controller can then obtain, from each target cell of the set of target cells, hard bit data using each strobe read of the set. For example, for each target cell, the local media controller can obtain hard bit data using strobe read $s_1, s_2, s_3$, and $s_4$. Data obtained by the strobe reads can be stored in the sense amplifier of the memory array. The local media controller can then determine, for each target cell, data from which strobe read to store to the hard bit latch. In some embodiments, for each target cell, the local media controller can store the hard bit from the strobe read that corresponds to the corresponding latched aggressor state data (e.g., $s_1$ to $S_1$, $s_2$ to $S_2$, $s_3$ to $S_3$, $s_4$ to $S_4$). In other embodiments, other configurations can be used. For example, for a memory cell where the aggressor data is in state $S_1$, the local media controller can store, in the corresponding hard bit latch, the data obtained from strobe read $s_1$.

To obtain the semi-soft bit data, for each target memory cell, the local media controller can perform an exclusive nor (XNOR) operation on the data obtained from two different strobe reads performed on the target memory cell. To determine which two strobe reads to use for the XNOR operation, the local media controller can refer to a reference table (e.g., a metadata table) that indicates which strobe reads to use based on the aggressor data of the memory cell. In an illustrative example, in memory cells where the aggressor data is in the $S_1$ state, the local media controller can perform an XNOR operation on the data obtained by strobe read $s_1$ and $s_2$. In another example, in memory cells where the aggressor data is in the $S_2$ state, the local media controller can perform an XNOR operation on the data obtained by strobe read $s_1$ and $s_3$. In yet another example, in memory cells where the aggressor data is in the $S_3$ state, the local media controller can perform an XNOR operation on the data obtained by strobe read $s_2$ and $s_4$. In yet another example, in memory cells where the aggressor data is in the $S_4$ state, the local media controller can perform an XNOR operation on the data obtained by strobe read $s_3$ and $s_4$. The data output from XNOR operation can be stored in the corresponding semi-soft bit latch as the semi-soft bit data. In some embodiments, the semi-soft bit data can then be used during the error handling operations to, for example, determine hard bit reliability, which hard bits are correct, etc.

Advantages of the present disclosure include, but are not limited to, improved memory device performance and decreased latency. For example, using semi-soft bit data during corrective read operations can improve read accuracy, reduces the rate of invoking long latency corrective read operations to obtain soft bit data, which reduces read errors and increases the life of a memory device.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The local media controller 135 can implement a corrective read (CR) component 137 that can obtain semi-soft bit data during corrective reads. To obtain the semi-soft bit data during a corrective read, the CR component 137 can initiate a read operation with respect to a set of target cells connected to a target wordline. For example, the CR component 137 can initiate the read operation in response to receiving a request (e.g., read command) via the memory sub-system controller 115 to read the set of target cells.

The CR component 137 can obtain, for each target cell, cell state information for a respective group of adjacent cells. In some embodiments, each group of adjacent cells includes a single cell. In some embodiments, each group of adjacent cells includes a pair of cells. For example, if the memory device 130 is a 3D memory device, the group of adjacent cells can include a cell directly located above its target cell and/or a cell located directly below its target cell. Each cell of the group of adjacent cells is connected to a respective wordline of a group of adjacent wordlines neighboring the target wordline. For example, if the memory device 130 is a 3D memory device, the group of adjacent wordlines can include a wordline located directly above the target wordline and/or a wordline located directly below the target wordline. The cell state information for each pair of adjacent cells can be stored in a respective page buffer. In some embodiments, the cell state information for a cell of a group of adjacent cells is a $V_t$ indicative of a state of the cell.

In some embodiments, the cell state information is 1-bit information. For example, 1-bit information can be a logical "0" indicative of at least one cell of the group of adjacent cells having a programmed state. As another example, the 1-bit information can be a logical "1" indicative of each cell of the group of adjacent cells having an erased state.

In some embodiments, the cell state information is 2-bit information. For example, the 2-bit information can be a logical "00" indicative of both cells of a pair of adjacent cells having a programmed state. As another example, the 2-bit information can be a logical "01" or "10" indicative of one cell of a pair of adjacent cells having a programmed state and the other cell of the pair of adjacent cells having an erased state. As yet another example, the 2-bit information can be a logical "11" indicative of both cell of the pair of adjacent cells having an erased state.

The CR component 137 can then obtain a hard bit data by scanning (e.g., perform a read operation) each target cell by performing a "hard" strobe generally in the middle of a valley between two threshold voltage distributions. The hard bit data can be stored in a corresponding buffer. The CR component 137 can then generate a semi-soft bit data using the corresponding adjacent cell state information and the hard bit. The CR component 137 can then, using the hard bit data and/or semi-soft bit data, determine a calibrated read level offset for reading the group of target cells. Further details with regards to the operations of the CR 137 are described below.

Figure 1B:
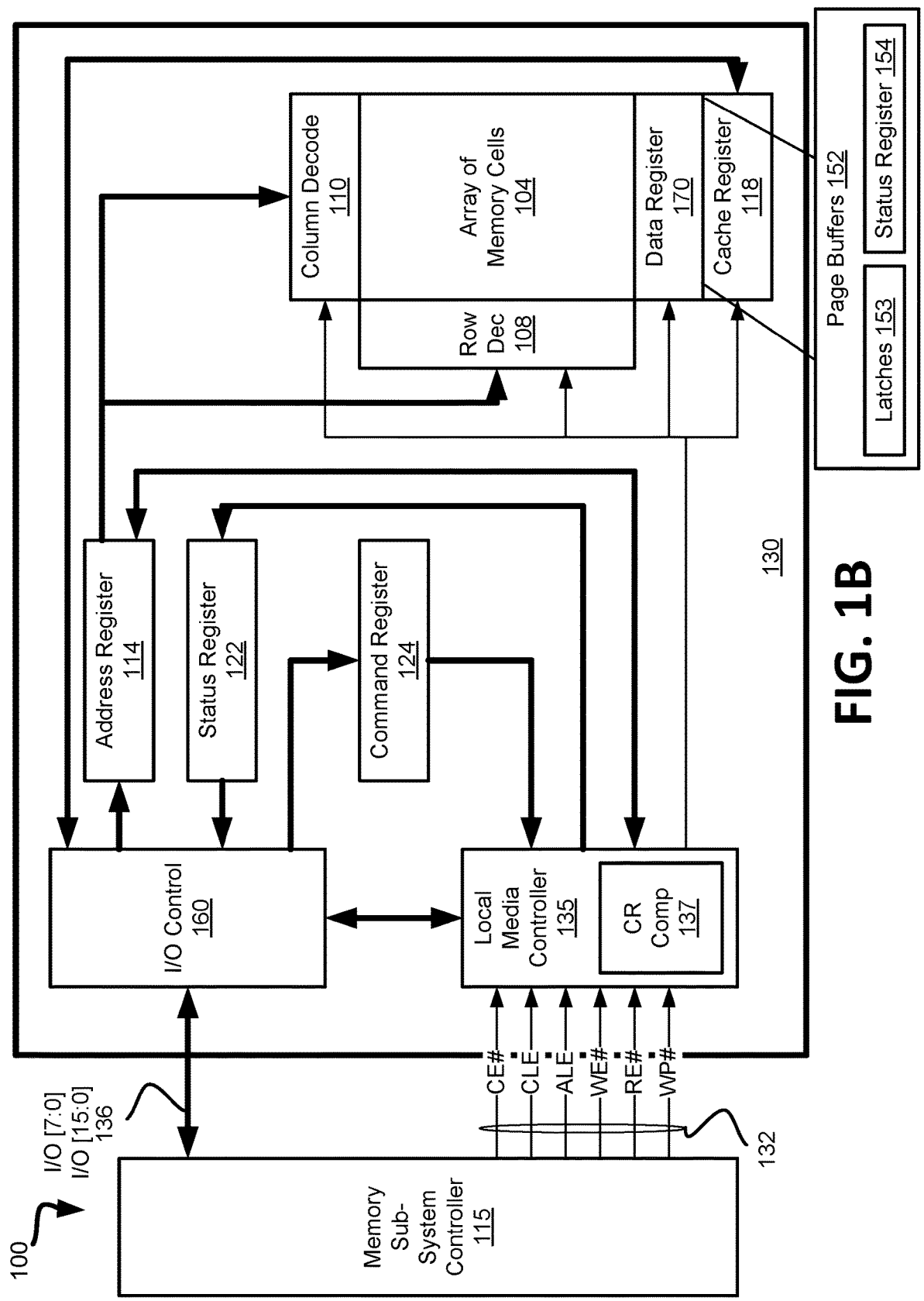
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 112 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 112 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 112 to control the row decode circuitry 108 and column decode circuitry 112 in response to the addresses. In one embodiment, local media controller 135 includes the CR component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer 152 of the memory device 130. A page buffer 152 may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

In these embodiments, each page buffer of the one or more page buffers 152 includes latches 153 (at least a first latch and a second latch) and a status register 154. The status register 154 may also be located outside the one or more pages buffers 152 within the memory device.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
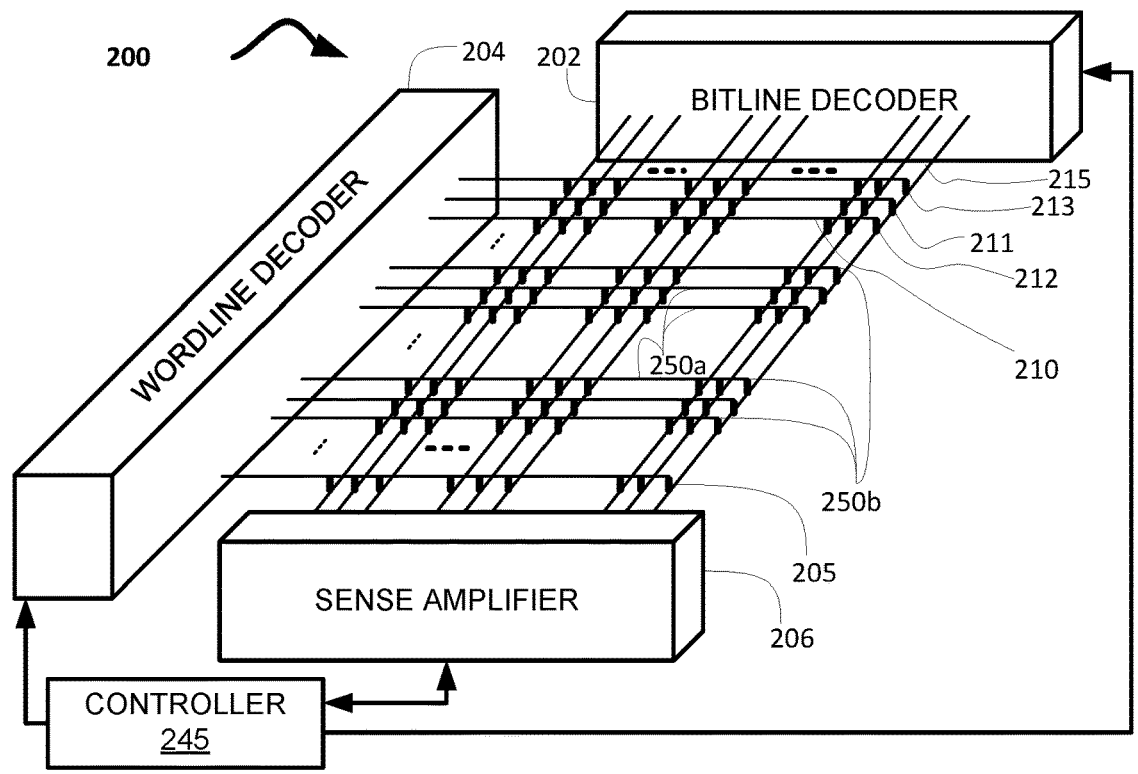
FIG. 2A illustrates an example array of memory cells, in accordance with some embodiments of the present disclosure.
Figure 2B:
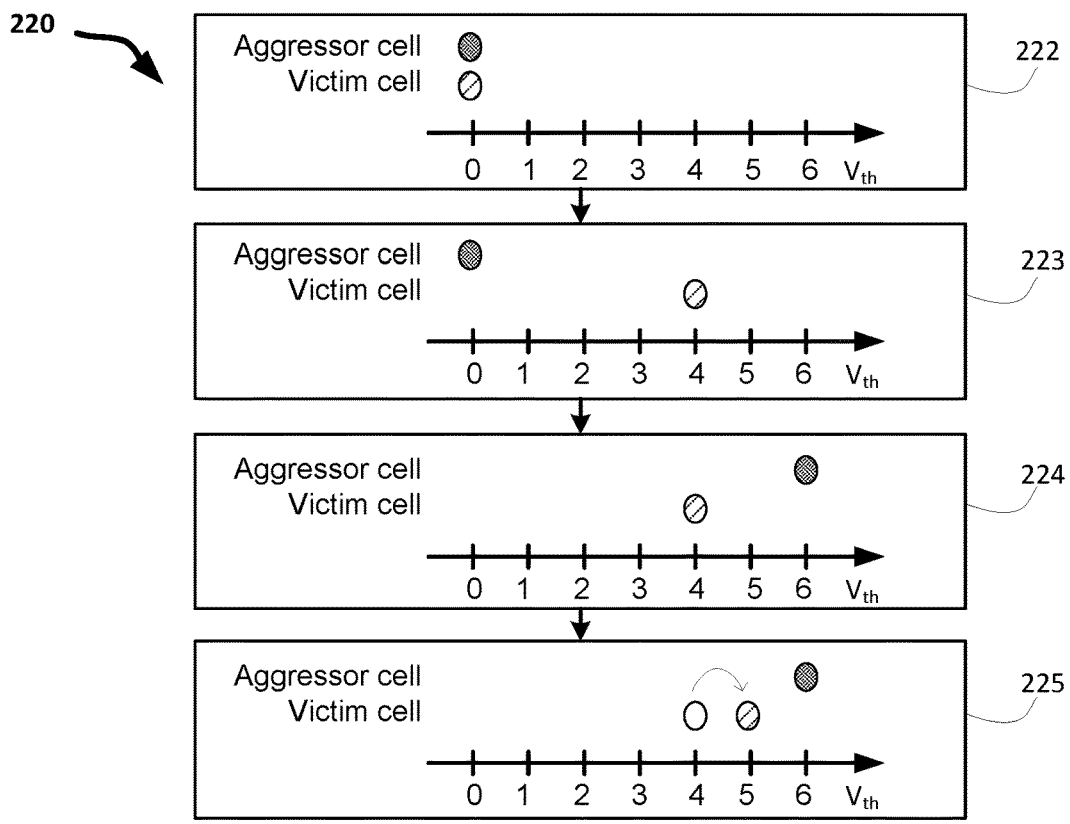
FIG. 2B illustrates the effects of an aggressor memory cell programming level on the threshold voltage of a victim memory cell, in accordance with some embodiments of the present disclosure.

FIGS. 2A-2B which depict an example memory cell arrangement and the effects of cell-to-cell coupling and lateral migration, respectively. FIG. 2A illustrates an array 200 of multiple TLC memory cells 205, 211, 212, 213. Memory array 200 can include multiple wordlines 210 (e.g., row lines) and multiple bitlines 215 (e.g., column lines, pillars, labeled. In some embodiments, each row of memory cells 205, 211, 212, 213 is connected to a wordline 210, and each column of memory cells 205, 211, 212, 213 is connected to a bitline 215. Activating or selecting a wordline 210 or a bitline 215 can include applying a voltage to the respective lines.

Wordlines 210 and bitlines 215 can be substantially perpendicular (i.e., orthogonal) to one another or otherwise intersect one another to create an array of memory cells. As shown in FIG. 2A, one memory cell 212 can be located at the intersection of two conductive lines such as a wordline 210 and a bitline 215. This intersection can be referred to as an address of a memory cell 212. A specified memory cell 212 can be a memory cell 212 located at the intersection of an energized wordline 210 and bitline 215; that is, wordline 210 and bitline 215 can be energized to read, write, or otherwise access a memory cell 212 at their intersection. Other memory cells 205, 211, 213 that are in electronic communication with (e.g., connected to) the same wordline 210 or bitline 215 can be referred to as unspecified memory cells 205, 211, 213.

Electrodes can be coupled to a memory cell 205, 211, 212, 213 and a wordline 210 or a bitline 215. The term electrode can refer to an electrical conductor, and in some embodiments, can be employed as an electrical contact to a memory cell 205, 211, 212, 213. An electrode can include a trace, wire, conductive line, conductive layer, or the like that provides a conductive path between elements or components of memory device 130. In some examples, a memory cell 205, 211, 212, 213 can include multiple self-selecting or other memory components (e.g., a selection component and a storage component) separated from each other and from access lines 210, 215 by electrodes. For self-selecting memory cells 205, 211, 212, 213, a single component (e.g., a section or layer of chalcogenide material within the memory cell 205, 211, 212, 213) can be used as both a storage element (e.g., to store or contribute to the storage of a state of memory cell 205) and as a selector element (e.g., to select or contribute to the selection of the memory cell 205, 211, 212, 213).

In some embodiments, operations such as reading and writing can be performed on memory cells 205, 211, 212, 213 by activating or selecting a corresponding wordline 210 and bitline 215. Accessing memory cells 205, 211, 212, 213 can be controlled through a wordline decoder 204 and a bitline decoder 202. For example, a wordline decoder 204 can receive a row address from the memory controller 245 (which can be a version of memory sub-system controller 115 of FIG. 1A) and activate the appropriate wordline 210 based on the received row address. Such a process can be referred to as decoding a row or wordline address. Similarly, a bitline decoder 202 can receive a column address from the memory controller 245 and activate the appropriate bitline 215. Such a process can be referred to as decoding a column or bitline address. A wordline decoder 204 and/or bitline decoder 202 can be examples of decoders implemented using decoder circuitry, for example. In some embodiments, wordline decoder 204 and/or bitline decoder 202 can include circuitry that is configured to increase a voltage applied to a wordline 210 or bitline 215 (respectively).

In some embodiments, a memory cell 205, 211, 212, 213 can be read (e.g., sensed) by a sense amplifier 206 when the memory cell 205, 211, 212, 213 is accessed (e.g., in cooperation with the memory controller 245, wordline decoder 204, and/or bitline decoder 202) to determine a logic state stored by the memory cell 205, 211, 212, 213. The sense amplifier 206 can provide an output signal indicative of (e.g., based at least in part on) the logic state stored by the memory cell 205, 211, 212, 213 to one or more components (e.g., to the bitline decoder 202, the memory controller 245).

In some embodiments, the detected logic state can be provided to a host system 120 (e.g., a device that uses the memory device 130 for data storage), where such signaling can be provided directly from the memory controller 245, memory sub-system controller 115.

In some embodiments, sense amplifier 206 can include various transistors or amplifiers to detect and amplify a difference in signals obtained based on reading a memory cell 205, 211, 212, 213, which can be referred to as latching. The detected logic state of memory cell 205, 211, 212, 213 can then be output through bitline decoder 202 as output. In some embodiments, sense amplifier 206 can be part of a bitline decoder 202 or row decoder 120. Alternatively, sense amplifier 206 can be connected to or in electronic communication with bitline decoder 202 or wordline decoder 204.

In some embodiments, read/write/erase operations can be performed on memory cells 205, 211, 212, 213. The performance of such operations can be controlled by memory controller 245 (which can be a version of memory sub-system controller 115 of FIG. 1A). Accordingly, operations, such as write operations to be performed on memory array 200 can be distributed among the memory cells 205, 211, 212, 213. In one embodiment, the wordlines 210 can be grouped according to a value of a metric reflecting a property or characteristic of the memory cells of the group (e.g., a default voltage that needs to be applied to program the cells of the wordline to a particular programming level). For example, in the embodiment depicted in FIG. 2A, some of the wordlines 210 of array 200 can be grouped into a first group 250a that by default initially needs voltage X to program its cells to programing level 2, and a second group 250b that by default initially needs voltage Y to program its cells to programing level 2. Each of the groups can have a value of a metric that that reflects a property or characteristic of the memory cells in the group falling within a range of possible values.

These default values and other characteristics of the memory cells 205, 211, 212, 213 can be altered by the effects of cell-to-cell coupling and lateral migration described above. Take for example, memory cell 211 that is specified to be accessed by a memory access operation (e.g. read/write) by specifying and activating the respective bitline and wordline at the intersection of which it is located. The specified wordline can be referred to as an n-th wordline ($WL_n$), and the adjacent wordlines can include adjacent wordline n-1 ($WL_{n-1}$) and adjacent wordline n+1 ($WL_{n+1}$). Thus, the specified cell 211 can have a respective group of adjacent cells. Each group of adjacent cells can include at least one cell that neighbors its respective specified cell (e.g., one cell 212 connected to $WL_{n-1}$ and/or one cell 213 connected to $WL_{n+1}$).

The memory cells 205, 211, 212, 213 can be categorized into aggressor cells and victim cells. More specifically, an aggressor memory cell can be defined by an effect its programming level has on a threshold voltage of an adjacent memory cell. The adjacent cell can thus be defined as the victim cell as it is affected by the programming level of the aggressor cell. This categorization and relationship is depicted in the flow chart of FIG. 2B.

Take for example memory cell 211 which can be subject to the effects of phenomena such as of cell-to-cell coupling and lateral migration. If memory cell 211 is subject to an effect of a programming level of its adjacent cell 212, then memory cell 211 can be considered to be the victim cell 211 and the adjacent cell 212 can be considered to be the aggressor cell 212. Initially, at block 222, both cells have a $V_t$ of 0. When the victim cell 211 is programmed, at block 223, to have a $V_t$ of 4v, it might not yet be affected by the programming level of the aggressor memory cell 212 since the aggressor memory cell 212 still has a $V_t$ of 0 v. Thereafter, the cell-to-cell coupling effect can become observable as the aggressor memory cell 212 is programmed at block 224 to have a $V_t$ of 6 v. As can be seen in block 225, the $V_t$ of the victim cell 211 can increase from 4 v to 5 v caused by the programming level corresponding to the aggressor memory cell's $V_t$ of 6 v due to C2C coupling. In a similar manner, the $V_t$ of victim memory cell 211 can be affected by the programming level (i.e., by the corresponding $V_t$) of adjacent aggressor cell 213.

In some embodiments, to compensate for the shifts, CR 137 can perform corrective read operations (e.g., adjust read reference voltages applied during the read operations that are offset by an amount corresponding to the shift), in accordance with embodiments discussed within.

FIG. 2C illustrates an example plot 210 of victim cell $V_t$ depicted in accordance with an embodiment of the disclosure. The example plot 230 of $V_t$ distributions is associated with of an example group of TLC memory cells (e.g., cells 205, 211, 212, 213) programmed to programming level 3. As can be seen, the overarching distribution 239 of $V_t$ for the cells programmed to programming level 3 includes multiple sub-distributions 231-238. Each of these sub-distributions 231-238 reflect the $V_t$ of victim cells programmed to level 3 that happen to have an adjacent aggressor memory cell programmed to a particular programming level that shifts the respective $V_t$ of the victim cell. For example, sub-distribution 231 is a distribution of $V_t$ that is not shifted because the adjacent aggressor cells of the victim cells in the distribution are programmed to programming level 0. In contrast, sub-distribution 232 is shifted due to aggressor memory cells programmed to programming level 1. Sub-distribution 233 is shifted due to aggressor memory cells programmed to programming level 2. Sub-distribution 234 is shifted due to aggressor memory cells programmed to programming level 3. Sub-distribution 235 is shifted due to aggressor memory cells programmed to programming level 4. Sub-distribution 236 is shifted due to aggressor memory cells programmed to programming level 5. Sub-distribution 237 is shifted due to aggressor memory cells programmed to programming level 6. Sub-distribution 238 is shifted due to aggressor memory cells programmed to programming level 7.

Accordingly, it can be seen how the $V_t$ distribution for a set of victim memory cells has sub-distributions of $V_t$ dependent on the programming level of aggressor memory cells. For example, the sub-distribution 238 is shifted to the right relative to the default sub-distribution 231 by a greater amount than sub-distribution 234. This is because the victim cells of sub-distribution 238 are adjacent to aggressor cells of a higher programming level (i.e., 7) than those of sub-distribution 234. Notably, variations of the depicted shifts that are shown for one victim cell programming level can also exist for other programming levels of the victim cell. The other programming levels of the victim cells can likewise be affected by the programming levels of adjacent aggressor cells and have corresponding shifts in their respective sub-distributions.

Figure 3:
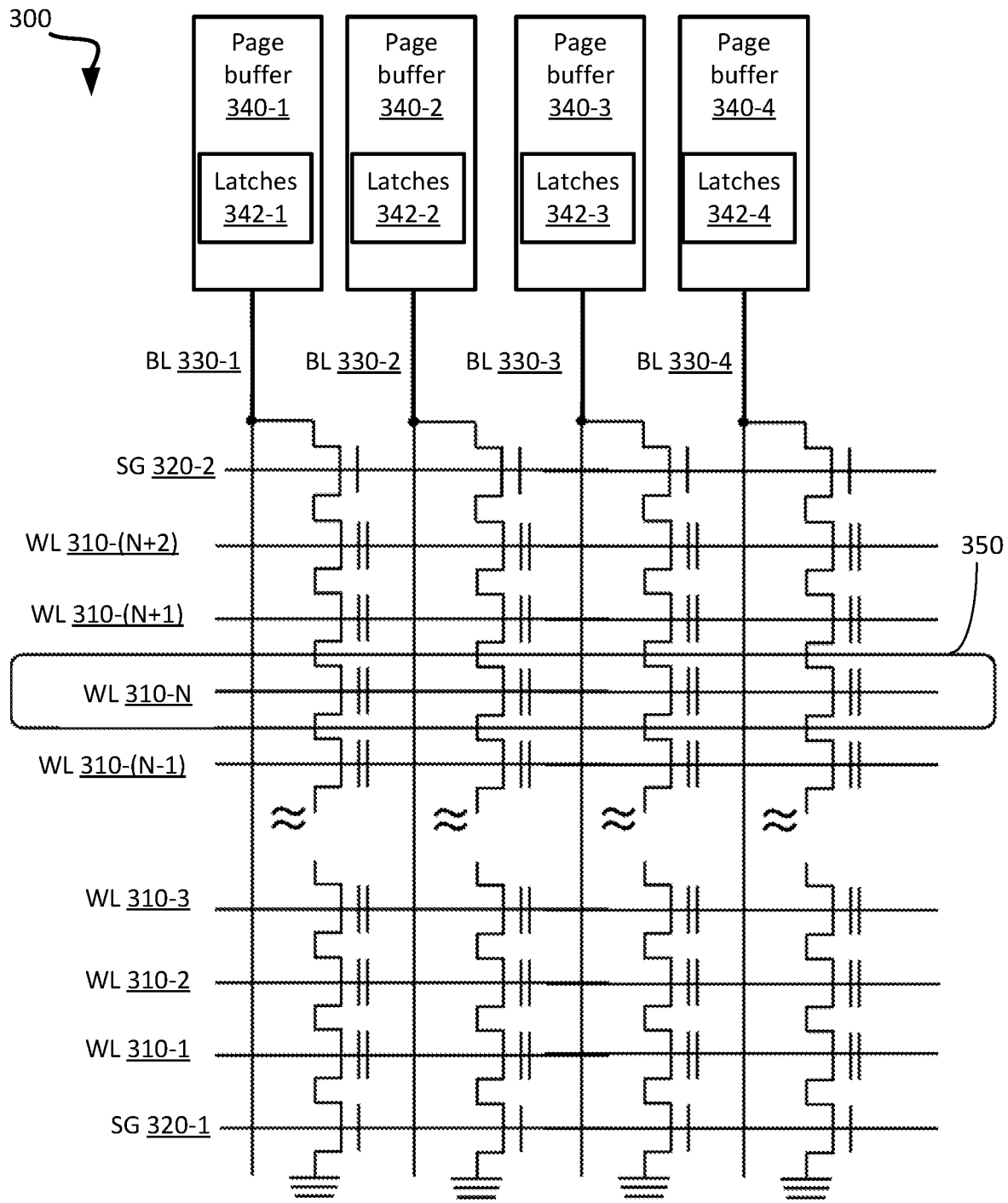
FIG. 3 is a diagram of a portion of a memory device, in accordance with some embodiments of the present disclosure.

FIG. 3 is a diagram of a portion of a memory array 300, in accordance with some embodiments. The memory array 300 can include any suitable number of wordlines (WLs). For example, as shown, the memory array 300 includes a number of wordlines WL 310-1 through WL 310-(N+2). Each of the WLs 310-1 through 310-(N+2) is connected to a respective set of cells. Each of the WLs 310-1 through 310-(N+2) is adjacent to at least one WL. For example, WL 310-(N+1) and WL 310-(N−1) are each adjacent wordlines with respect to WL 310-N. The memory array 300 further includes select gate (SG) 320-1 and SG 320-2 In some embodiments, SG 320-1 is a source-side SG (SGS) and SG 320-2 is a drain-side SG (SGD).

The memory array 300 further includes a number of bitlines (BLs) including BL 330-1 through 330-4 and a number of page buffers including page buffers 340-1 through 340-4. Each of the page buffers is connected to a respective one of the bitlines. Although only 4 bitlines 330-1 through 310-3 and page buffers 340-1 through 340-4 are shown, the memory array 300 can include any suitable number of bitlines and page buffers. Each of the page buffers can include one or more latches 342-1 through 342-4 used to latch data sensed from the memory array during a read operation, and to store data to be programmed into the memory array. In one embodiment, each of latch 342-1 through 342-4 includes four latches (e.g., one or more PDCs and one or more secondary data cache SDCs). In another embodiment, each of latch 342-1 through 342-4 includes five latches. It is noted that each of latch 342-1 through 342-4 can include any number of latches.

In this illustrative example, a set of target cells 350 is selected to be read. The set of target cells 350 includes a number of cells of the target wordline WL 310-N. Each target cell of the set of target cells 350 is adjacent to a pair of adjacent cells. More specifically, the pair of adjacent cells for a particular target cell includes the cell connected to WL 310-(N+1) that is directly above the target cell, and the cell connected to WL 310-(N−1) that is directly below the target cell. That is, a target cell of the set of target cells 350 is connected to a same one of the bitlines as its respective pair of adjacent cells.

A local media controller (e.g., local media controller 135 of FIGS. 1A-1B) can initiate a read operation with respect to the set of target cells 350. The local media controller can, for each target cell of the set of target cells 350, cause cell state information to be obtained for each cell of the respective group of adjacent cells. The cell state information for each cell can include a $V_t$ value indicative of the state of the cell (e.g., program state or erase state). For each cell of a group of adjacent cells, the cell state information can include a $V_t$ value indicative of a state of the cell.

In some embodiments, the cell state information for each group of adjacent cells is 1-bit information. For example, if each group of adjacent cells includes a single cell (e.g., a cell of WL 310-(N−1) or a cell of WL 310-(N+1)), then the cell state information for each group of adjacent cells can be 1-bit information obtained from the single cell.

In some embodiments, the cell state information for each group of adjacent cells is 2-bit information. For example, if each group of adjacent cells includes a single cell (e.g., a cell of WL 310-(N−1) or a cell of WL 310-(N+1)), then the cell state information for each group of adjacent cells can be 2-bit information obtained from the single cell.

As another example, if each group of adjacent cells includes a pair of cells (e.g., a cell of WL 310-(N−1) and a cell of WL 310-(N+1)), then the cell state information for each group of adjacent cells can be 1-bit information obtained from each cell of the pair of cells.

In some embodiments, the cell state information for each group of adjacent cells is 4-bit information. For example, if each group of adjacent cells includes a pair of cells (e.g., a cell of WL 310-(N−1) or a cell of WL 310-(N+1)), then the cell state information for each group of cells can include 2-bit information obtained each cell of the pair of cells.

Figure 4:
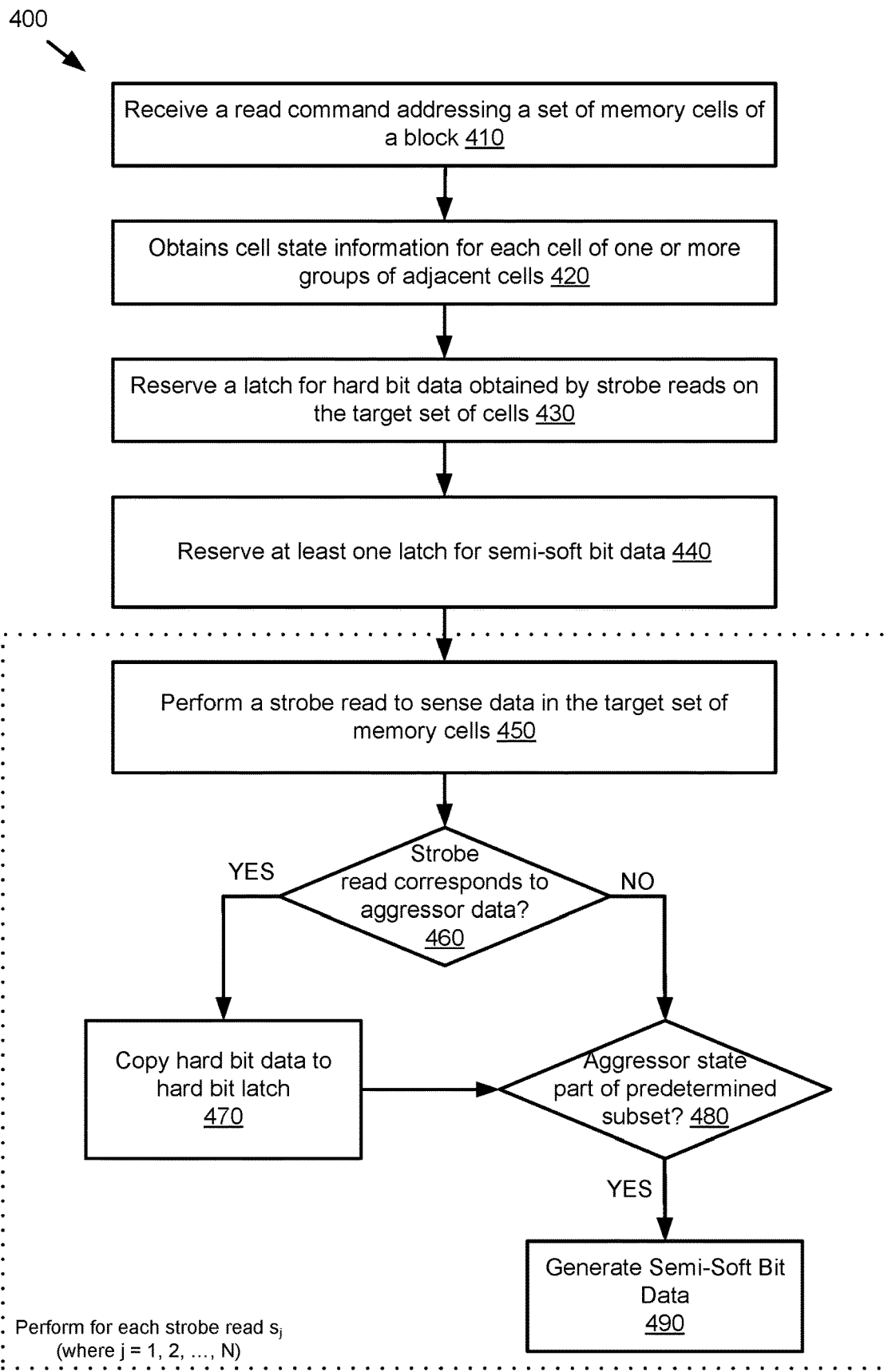
FIG. 4 is a flow diagram of an example method for generating semi-soft bit data in memory devices, in accordance with some embodiments of the present disclosure.

FIG. 4 is a flow diagram of an example method 400 for generating semi-soft bit data in memory devices, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the CR 137 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the method 400 can be applied to a memory device having multiple target memory cells (e.g., victim cells) and adjacent memory cells (e.g., aggressor cells) in one or more arrays. The adjacent memory cells can be defined as aggressors relative to specified memory cells that can be defined as victim cells based on the effect that the programming level of the aggressor cells has on a threshold voltage adjacent victim memory cells.

At operation 410, the processing logic receives a read command addressing a set of memory cells of a block (e.g., a target set of memory cells). In some embodiments, the target set of memory cells can a set of memory pages of the block. The read operation can be initiated in response to a host request, a maintenance operation performed by the memory sub-system controller (e.g., a garbage collection operation, an error correction operation, a data refresh operation, etc.), etc. The set of target memory cells can be addressed by a physical address. In response to the processing logic performing the read command, the processing logic can determine that a read error occurred. Accordingly, the processing logic can initiate an error-handling flow (one or more error-handling operations) to correct the read error. In some embodiments, the error-handling flow can include performing one or more corrective read operations.

At operation 420, the processing logic obtains cell state information for each cell of one or more groups of adjacent cells (also referred to as aggressor data). In some embodiments, the cell state information for each cell can reflect the logical level of the cell. For example, if a cell is an SLC cell, the cell state information can reflect whether the cell is in the L0 state or the L1 state. As another example, if the cell is a TLC cell, the cell state information can reflect which of the states L0-L7 that the cell is in. In some embodiments, the cell state information can reflect to which group of levels the cell belongs to. For example, for a TLC cell that has eight states, 1-bit of aggressor data can differentiate 2 groups of states, where four states belong to one group, and the other four states belong to the other group. In another example, for a TLC cell that has eight states, 2-bits of aggressor data can differentiate 4 groups of states, where two states (e.g., L0, L1) belong to the first group, two other states (e.g., L2, L3) belong to the second group, yet two other states (e.g., L4, L5) belong to the third group, and the last two states (e.g., L6, L7) belong to the fourth group.

The cell state information for a cell can be obtained by identifying the state of the cell. In some embodiments, the cell state information for each cell of a group of adjacent cells is 1-bit information. To obtain the 1-bit cell state information, the processing logic can apply a single strobe read to each cell of the group of adjacent cells. If the group of adjacent cells includes a single cell (a cell connected to a single adjacent wordline, e.g., the adjacent wordline $WL_{n-1}$ or $WL_{n+1}$), then the stored cell state information is 1 bit in total. If the group of adjacent cells includes a pair of cells (cells connected to both adjacent wordlines, e.g., $WL_{n-1}$ and $WL_{n+1}$), then the stored cell state information is 2 bits in total.

For each adjacent cell of each adjacent wordline (e.g., $WL_{n-1}$ and/or $WL_{n+1}$), the cell state information can be stored in a respective page buffer (e.g., in one or more latches of the page buffer). For example, the cell state information of each cell of the group of adjacent cells corresponding to adjacent wordline $WL_{n-1}$ can be stored in a first latch of a respective page buffer, and the cell state information of each cell of the group of adjacent cells corresponding to adjacent wordline $WL_{n+1}$ can be stored in a second latch of a respective page buffer.

For each cell, the processing logic can perform a predetermined set of strobe reads, which is a read operation performed at a particular read level offset (e.g., by applying the read level offset to a base read level). In some embodiments, the number (N) of aggressor cell states ($S_1$, $S_2$, ..., $S_N$) is determined as $N=2^n$, where n is the number of latches reserved for the aggressor data. The processing logic can perform a set of strobe reads (e.g., $s_1$, $s_2$, ..., $s_N$) corresponding to the number of aggressor cell states.

At operation 430, the processing logic reserves dedicated latch for hard bit data obtained by strobe reads performed on the target set of cells. In particular, the processing logic can reserve, in each page buffer, a latch for storing the hard bit data.

At operation 440, the processing logic reserves at least one latch for semi-soft bit data. In particular, the processing logic can reserve, in each page buffer, one or more latches for storing semi-soft bit data generated by operation 490. The number of reserved latches for the corresponding semi-soft bit data can be set in view of the amount of available latches in each page buffer, the type of corrective read performed (e.g., a 1-bit corrective read, a 2-bit-corrective read, a 3-bit corrective read, a 4-bit corrective read, etc.), or any other factors or combinations. In one example, for a memory device with where each page buffer includes four latches, the processing logic can perform a 2-bit corrective read, where two latches are used to store aggressor data, one latch is used to store data obtained from a hard strobe read on the target set of memory cells, and the last latch is used to store generated semi-soft bit data. In another example, for a memory device with where each page buffer includes five latches, the processing logic can perform a 3-bit corrective read, where three latches are used to store aggressor data, one latch is used to store data obtained from a hard strobe read on the target set of memory cells, and the last latch is used to store generated semi-soft bit data. In yet another example, for a memory device with where each page buffer includes five latches, the processing logic can perform a 2-bit corrective read, where two latches are used to store aggressor data, one latch is used to store data obtained from a hard strobe read on the target set of memory cells, and the remaining two latches are used to store generated semi-soft bit data. The configuration of the dedicated buffers can be set during manufacturing or calibration of the memory subsystem, by firmware updates, etc. In some embodiments, the latches for storing the semi-soft bit data can be initially set to 1. This can allow subsequent XNOR operations to be performed with respect to the latches.

Operations 450-490 can be performed using each strobe read value of the set of strobe reads (e.g., $s_1$, $s_2$, ..., $s_N$). The strobe read will be referred to as strobe read $s_j$, where "j" is equal to the number of aggressor cell states (e.g., j=1, 2, ..., N). In this example, where N is equal to four, the processing logic can perform each of operation 450-490 for each different strobe read (e.g., four different reads performed at four different read level offset value).

At operation 450, the processing logic performs a strobe read s j to sense the data in the target set of memory cells (e.g., the target page(s) or wordline). In some embodiments, the target cells can then be scanned by performing a strobe read generally in the middle of a valley between two threshold voltage distributions. The $V_t$ values of cells obtained by the strobe reads can be compared to reference voltages, and the bit information obtained by the comparison can be referred to as hard bit data. In some embodiments, the hard bit data can be temporarily stored in a cache on the sense amplifier.

At operation 460, the processing logic can determine, for each cell in the target set of cells, whether the aggressor cell state data corresponds to the current strobe read. In an illustrative example, aggressor cell state $S_1$ can correspond to strobe read $s_1$, aggressor cell state $S_2$ can correspond to strobe read $s_2$, aggressor cell state $S_3$ can correspond to strobe read $s_3$, and aggressor cell state $S_4$ can correspond to strobe read $s_4$. Accordingly, if the processing logic performed strobe read $s_1$ in operation 450, the processing logic determines, for target cells, the adjacent cells are in the $S_1$ cell state. The aggressor data, for each cell, is obtained in operation 420 and stored in one or more latches of each respective page buffer.

Responsive to the aggressor data corresponding to the current strobe read, the processing logic proceeds to operation 470, where the processing logic copies the hard bit data to the reserved latch of the page buffer. The processing logic can obtain the hard bit data from the sense amplifier cache and copy the hard bit data into the reserved latch of the page buffer. In one example, for aggressor state $S_1$, hard bit latch is updated to the read value correlating to strobe read $s_1$. The processing logic can then proceed to operation 480. Responsive to the aggressor data not corresponding to the current strobe read, the processing logic proceeds to operation 480.

At operation 480, the processing logic determines, for each target cell, whether the aggressor state ($S_1$, $S_2$, ..., $S_N$) belongs to a predetermined subset of aggressor states. In some embodiments, a different scheme can be used to determine the predetermined subset of aggressor states for each aggressor state. In some embodiments, each scheme can be represented by T k (s J)), where k relates to a particular semi-soft bit latch (e.g., if one semi-soft bit latch is used, k=1, if two semi-soft bit latches are used, the first semi-soft bit latch is k=1 and the second semi-soft bit latch is k=2, and so forth). In an illustrative example, where a single semi-soft bit latch is used, four schemes can be used, expressed as $T_1(s_1)=\{S_1, S_2\}$, $T_1(s_2)=\{S_1, S_3\}$, $T_1(s_3)=\{S_2, S_4\}$, and $T_1(s_4)=\{S_3, S_4\}$. The schemes can be stored in a reference table (e.g., a metadata table). As such, in embodiments where the processing logic performs strobe read $s_2$, the processing logic can determine whether the aggressor data is in the $S_1$ and/or $S_3$ state.

Responsive to the aggressor state belonging to a predetermined subset of aggressor states, the processing logic proceeds to operation 490. At operation 490, the processing logic generates semi-soft bit data based on a predetermined scheme corresponding to the predetermined subset. In some embodiments, to generate the semi-soft bit data, the processing logic can perform a XNOR of the two bits obtained by two strobe reads as indicated by a scheme. For example, for scheme $T_1(s_2)$, the processing logic can perform an XNOR operation on the bit obtained by strobe read $s_1$ and $s_3$. XNOR inverts the output of an exclusive or (XOR) operation. Thus, XNOR can returns a logical "1" if inputs A and B are equal, and can return a logical "0" otherwise. For example, if A=0 and B=0 or A=1 and B=1, then A XNOR B=1. If A=0 and B=1 or B=0 and A=1, then A XNOR B=0. As an illustrative example, assume that the output of the strobe read $s_1$ is "111100" and the output of the strobe read $s_3$ is "110000". Then, the data output from XNOR operation (e.g., the semi-soft bit) is "110011". The processing logic can each respective semi-soft bit in the corresponding semi-soft bit latch.

In an illustrative example of a scheme, in memory cells where the aggressor data is in the $S_1$ state, the processing logic can perform an XNOR operation on the data obtained by strobe read $s_1$ and $s_2$. In another example, in memory cells where the aggressor data is in the $S_2$ state, the processing logic can perform an XNOR operation on the data obtained by strobe read $s_1$ and $s_3$. In yet another example, in memory cells where the aggressor data is in the $S_3$ state, the processing logic can perform an XNOR operation on the data obtained by strobe read $s_2$ and $s_4$. In another example, in memory cells where the aggressor data is in the $S_4$ state, the processing logic can perform an XNOR operation on the data obtained by strobe read $s_3$ and $s_4$. The data output from the XNOR operation can be stored in the corresponding semi-soft bit latch as the semi-soft bit data.

The processing logic can use the semi-soft bit data to improve error correction code (ECC) capability (e.g., the ECC capability of an ECC decoder). For example, semi-soft bits can be used to determine hard bit reliability. As another example, soft bits can be used to determining which hard bits to correct when there may be ambiguity. In some embodiments, the information obtained from the semi-soft bits can be passed through a log-likelihood ratio (LLR) operator, for example, used as a part of an error correction operation.

Figure 5A:
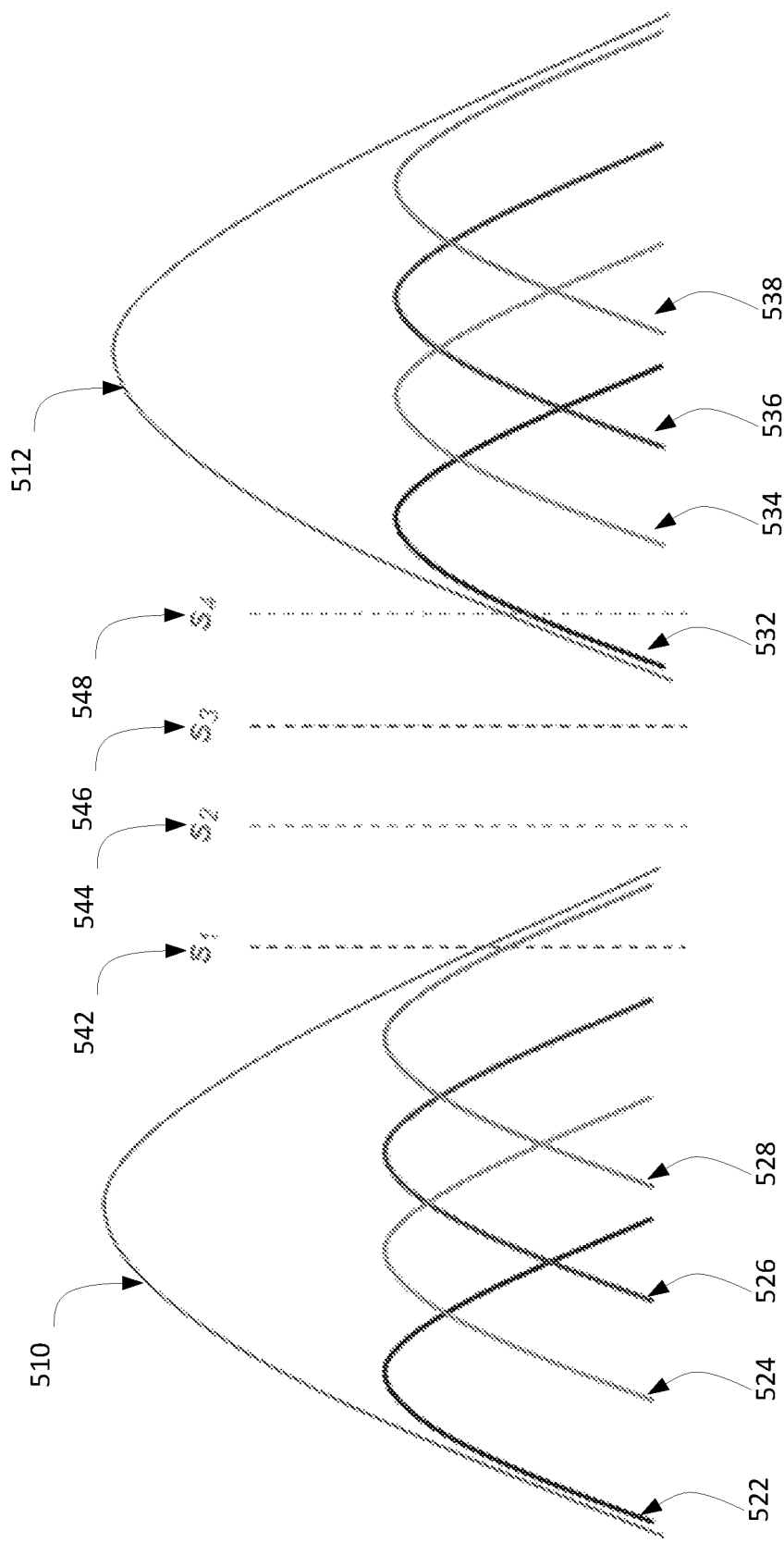
FIG. 5A depicts a pair of plot of threshold voltage distribution and their sub distributions, in accordance with some embodiments of the present disclosure.

FIG. 5A illustrates an example pair of distribution plots 510, 512, in accordance with some embodiments of the present disclosure. In plot 510, overarching $V_t$ distribution (e.g., for a set of target memory cells at programming level N) can include sub distributions 522, 524, 526, 526. In plot 512, overarching $V_t$ distribution (e.g., for another set of target memory cells at programming level N) can include sub distributions 532, 534, 536, 536. Each of the sub-distributions can be shifted by a different amount based on a corresponding aggressor cell programming level. FIG. 5A further illustrate a set of read strobes $s_1$ (542), $s_2$ (544), $s_3$ (546), and $s_4$ (548).

FIG. 5B illustrates an example case for a one-bit semi soft, two-bit corrective read, in accordance with some embodiments of the present disclosure. As illustrated, for each bitline, a page buffer can include four latches, where latch 0 and latch 1 store aggressor data, latch 2 stores hard bit data sensed from the target cells, and latch 3 stores semi-soft bit data. For each bitline, CR component 137 can sense all the target memory cells with read strobe $s_1$ and store hard bit data, for each bitline, in the sense amplifier. CR component 137 can then copy the data sensed by the $s_1$ read to the hard bit latch (e.g., latch 2) only on bitlines where the aggressor latches (e.g., latches 0 and 1) store aggressor data correlating to aggressor state $S_1$. CR component 137 can then generate semi-soft bit data using a XNOR operation (on the data sensed by two different read strobes as specified by a predefined scheme) only on bitlines that have specific aggressor data stored on the aggressor latches. For example, using the scheme expressed by $T_1(s_1)=\{S_1, S_2\}$, CR component 137 can perform a XNOR operation on the data sensed with read strobe $s_1$ and $s_2$. This is shown for bitlines 0 and m of FIG. 5B. The semi-soft bit data can be stored on the semi-soft bit latch (e.g., latch 3).

In another set of operations, for each bitline, CR component 137 can then sense all the target memory cells with read strobe $s_2$ and store the hard bit data, for each bitline, in the sense amplifier. CR component 137 can then copy the data sensed by the $s_2$ read to the hard bit latch only on bitlines where the aggressor latches store aggressor data correlating to aggressor state $S_2$. CR component 137 can then generate semi-soft bit data using a XNOR operation (on the read bits sensed by two different read strobes as specified by a predefined scheme) only on bitlines that have specific aggressor data stored on the aggressor latches. For example, using the scheme expressed by $T_1(s_2)=\{S_1, S_3\}$, CR component 137 can perform a XNOR operation on the data sensed with read strobe $s_1$ and $s_3$. This is shown for bitline 3 of FIG. 5B.

In yet another set of operations, for each bitline, CR component 137 can then sense all the target memory cells with read strobe $s_3$ and store hard bit data, for each bitline, in the sense amplifier. CR component 137 can then copy the data sensed by the $s_3$ read to the hard bit latch only on bitlines where the aggressor latches store aggressor state data correlating to aggressor state $S_3$. CR component 137 can then generate semi-soft bit data using a XNOR operation (on the read bits sensed by two different read strobes as specified by a predefined scheme) only on bitlines that have specific aggressor data stored on the aggressor latches. For example, using the scheme expressed by $T_1(s_3)=\{S_2, S_4\}$, CR component 137 can perform a XNOR operation on the data sensed with read strobe $s_2$ and $s_4$. This is shown for bitline 1 of FIG. 5B.

In another set of operations, for each bitline, CR component 137 can then sense all the target memory cells with read strobe $s_4$ and store the hard bit data, for each bitline, in the sense amplifier. CR component 137 can then copy the data sensed by the $s_4$ read to the hard bit latch only on bitlines where the aggressor latches store aggressor state data correlating to aggressor state $S_4$. CR component 137 can then generate semi-soft bit data using a XNOR operation (on the read bits sensed by two different read strobes as specified by a predefined scheme) only on bitlines that have specific aggressor data stored on the aggressor latches. For example, using the scheme expressed by $T_1(s_2)=\{S_3, S_4\}$, CR component 137 can perform a XNOR operation on the data sensed with read strobe $s_1$ and $s_3$. This is shown for bitlines 2 and 4 of FIG. 5B.

Figure 5C:
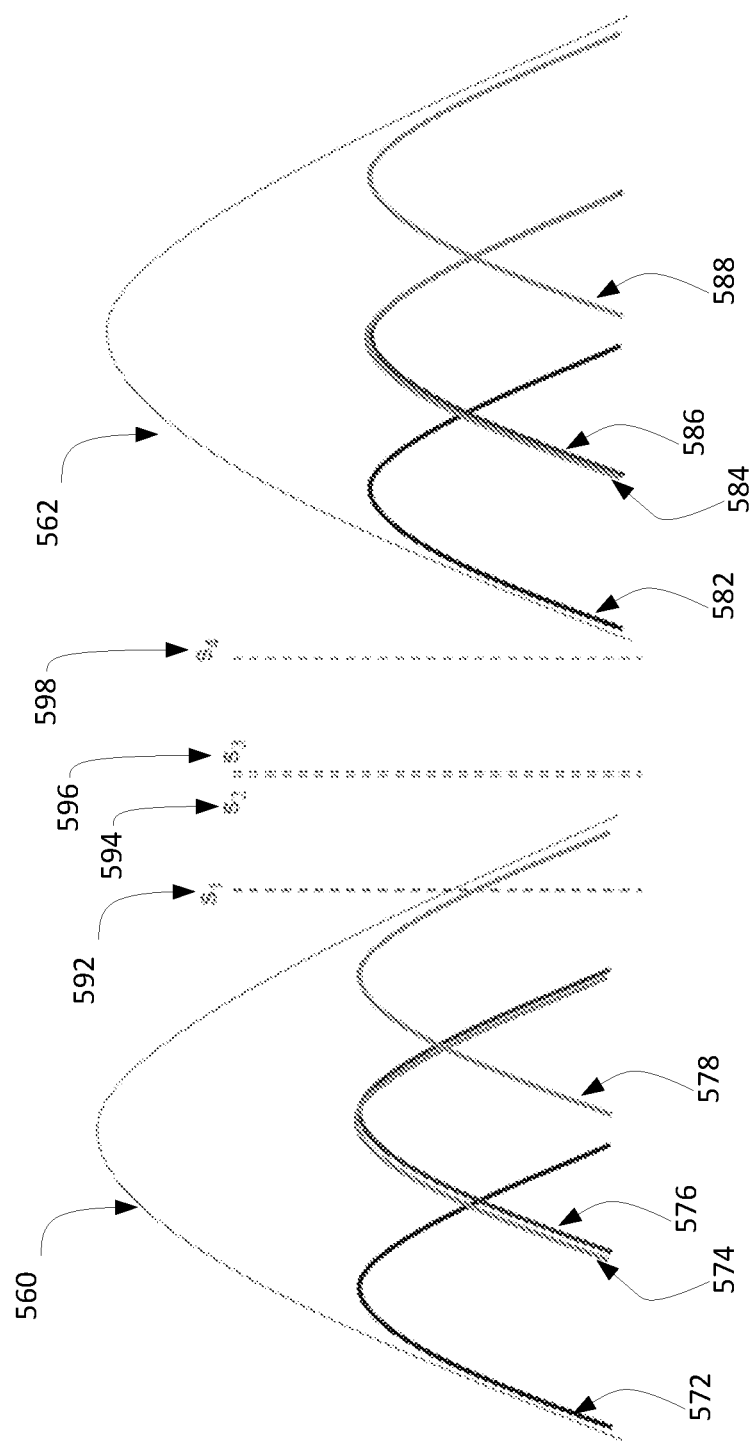
FIG. 5C illustrates an example pair of distribution plots, in accordance with some embodiments of the present disclosure.

FIG. 5C illustrates an example pair of distribution plots 560, 562, in accordance with some embodiments of the present disclosure. In plot 560, overarching $V_t$ distribution (e.g., for a set of target memory cells at programming level N) can include sub distributions 572, 574, 576, 576. In plot 562, overarching $V_t$ distribution (e.g., for another set of target memory cells at programming level N) can include sub distributions 582, 584, 586, 586. Each of the sub-distributions can be shifted by a different amount based on a corresponding aggressor cell programming level. FIG. 5C further illustrate a set of read strobes $s_1$ (592), $s_2$ (594), $s_3$ (596), and $s_4$ (598). As shown in FIG. 5C, the read strobe $s_2$ is relatively close to the read strobe $s_3$. Accordingly, for read strobe $s_2$, it is preferable to obtain the semi-soft bit data by performing a XNOR operation on the data obtained from sensing with read strobe $s_1$ and read strobe $s_4$ instead of performing a XNOR operation on the read bit obtained from sensing with read strobe $S_1$ and read strobe $s_3$. Similarly, for read strobe $s_3$, it is preferable to obtain the semi-soft bit data by performing a XNOR operation on the data obtained from sensing with read strobe $s_1$ and read strobe $s_4$ instead of performing a XNOR operation on the read bit obtained from sensing with read strobe $s_2$ and read strobe $s_4$. Accordingly, given any read strobe set (e.g., $s_1$, $s_2$, . . . , $s_N$), the CR component 137 can optimize the semi-soft bit XNORing operations to maximize mutual information. In some embodiment, the CR component 137 can optimize the XNORing operation (e.g., select a scheme for obtaining the semi-soft bit) based on the read offset value of the read strobe set. For example, response to determining that the difference between two read strobes satisfies a predetermined criterion (e.g., the value of the difference is greater than or less than a predetermined threshold), CR component 137 can select a different scheme. For example, CR component 137 can select a pair of read strobe whose calculated difference satisfied another threshold criterion.

Figure 6:
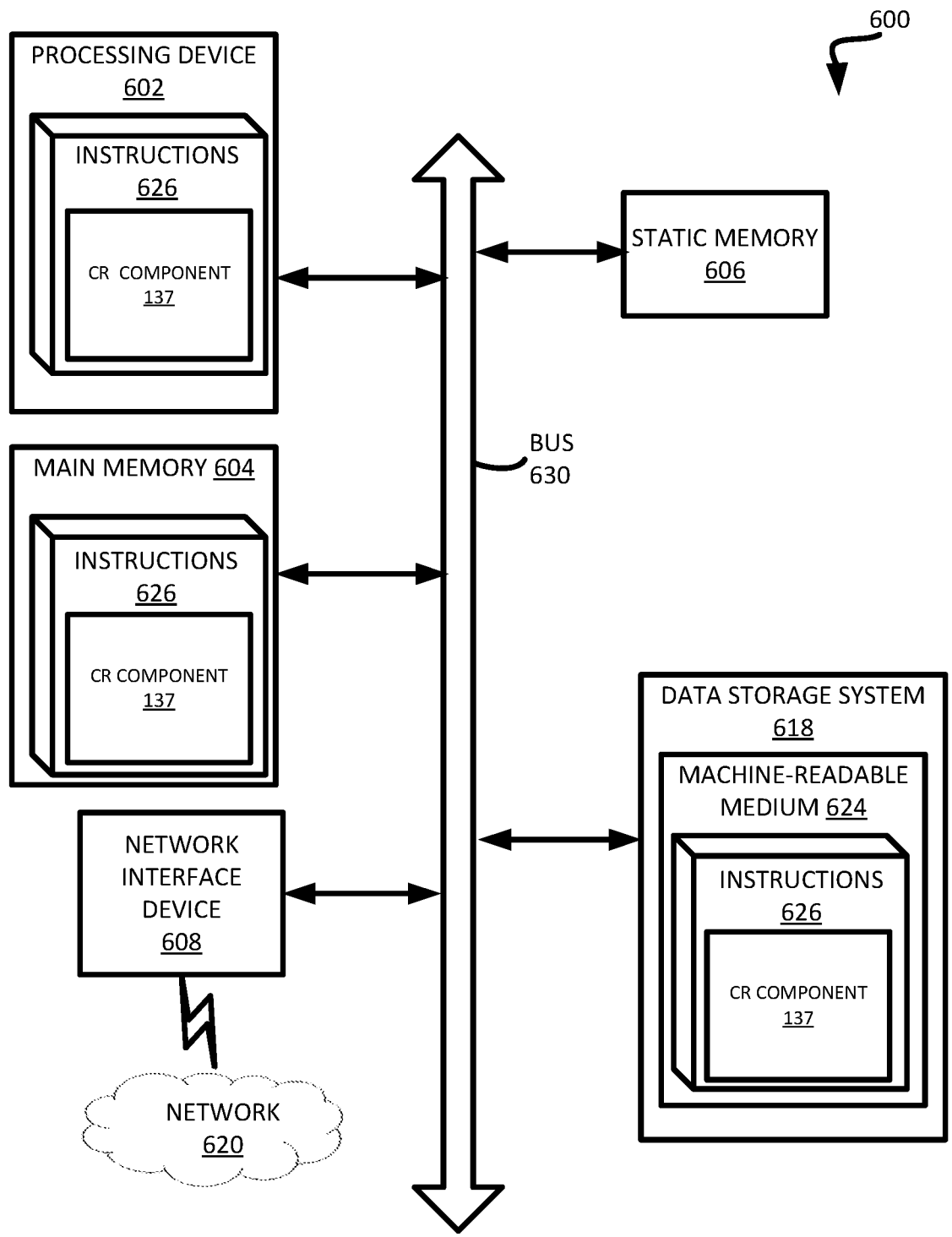
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to CR component 137 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

The example computer system 610 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a compensation management component (e.g., the CMC 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array comprising a plurality of memory cells, the plurality of memory cells comprising a set of target cells connected to a target wordline, wherein for each target cell of the set of target cells, a respective group of adjacent cells adjacent to the target cell comprises at least one cell connected to at least one wordline adjacent to the target wordline; and
control logic, operatively coupled with the memory array, to perform operations comprising:
causing a read operation to be initiated with respect to the set of target cells;
obtaining, for the respective group of adjacent cells, respective cell state information;
performing a set of strobe reads on the set of target cells;
identifying, by performing a lookup of a reference table, a first strobe read and a second strobe read, from the set of strobe reads, for generating semi-soft bit data based on the respective cell state information of the respective group of adjacent cells; and
generating, for a target cell of the set of target cells, the semi-soft bit data based on data obtained from the first strobe read and the second strobe read.

2. The memory device of claim 1, wherein generating the semi-soft bit data comprises:
performing an exclusive nor (XNOR) operation on the data obtained from the first strobe read and the second strobe read.

3. The memory device of claim 1, wherein the control logic is to perform operations further comprising:
storing the semi-soft bit data in a latch of a page buffer corresponding to the target cell.

4. The memory device of claim 1, wherein the control logic is to perform operations further comprising:
based on the respective cell state information of the respective group of adjacent cells, storing, in a latch associated with the target cell, hard bit data obtained from the first strobe read.

5. The memory device of claim 1, wherein:
the set of target cells defines a threshold voltage distribution; and
the respective group of adjacent cells defines a respective pair of group threshold voltage distributions.

6. The memory device of claim 1, wherein the control logic is to perform operations further comprising:
selecting the first strobe read and the second strobe read for generating the semi-soft bit data based on the respective cell state information of the respective group of adjacent cells.

7. The memory device of claim 1, wherein the control logic is to perform operations further comprising:
reserving, in a page buffer of the target cell, a first latch to store the respective cell state information of the respective group of adjacent cells;
reserving, in the page buffer, a second latch to store hard bit data obtained from a strobe read of the set of strobe reads; and
reserving, in the page buffer, at least one additional latch to store the semi-soft bit data.

8. A method comprising:
causing a read operation to be initiated with respect to a set of target cells;
obtaining, for a respective group of adjacent cells, respective cell state information;
performing a set of strobe reads on the set of target cells;
identifying, by performing a lookup of a reference table, a first strobe read and a second strobe read, from the set of strobe reads, for generating semi-soft bit data based on the respective cell state information of the respective group of adjacent cells; and
generating, for a target cell of the set of target cells, the semi-soft bit data based on data obtained from the first strobe read and the second strobe read.

9. The method of claim 8, wherein generating the semi-soft bit data comprises:
performing an exclusive nor (XNOR) operation on the data obtained from the first strobe read and the second strobe read.

10. The method of claim 8, further comprising:
storing the semi-soft bit data in a latch of a page buffer corresponding to the target cell.

11. The method of claim 8, further comprising:
based on the respective cell state information of the respective group of adjacent cells, storing, in a latch associated with the target cell, hard bit data obtained from the first strobe read.

12. The method of claim 8, wherein:
the set of target cells defines a threshold voltage distribution; and
the respective group of adjacent cells defines a respective pair of group threshold voltage distributions.

13. The method of claim 8, further comprising:
selecting the first strobe read and the second strobe read for generating the semi-soft bit data based on the respective cell state information of the respective group of adjacent cells.

14. The method of claim 8, further comprising:
reserving, in a page buffer of the target cell, a first latch to store the respective cell state information of the respective group of adjacent cells;
reserving, in the page buffer, a second latch to store hard bit data obtained from a strobe read of the set of strobe reads; and
reserving, in the page buffer, at least one additional latch to store the semi-soft bit data.

15. A non-transitory computer-readable storage medium comprising instructions that, when executed by a processing device, cause the processing device to perform operations comprising:
causing a read operation to be initiated with respect to a set of target cells;
obtaining, for a respective group of adjacent cells, respective cell state information;
performing a set of strobe reads on the set of target cells;
identifying, by performing a lookup of a reference table, a first strobe read and a second strobe read, from the set of strobe reads, for generating semi-soft bit data based on the respective cell state information of the respective group of adjacent cells; and
generating, for a target cell of the set of target cells, the semi-soft bit data based on data obtained from the first strobe read and the second strobe read.

16. The non-transitory computer-readable storage medium of claim 15, wherein generating the semi-soft bit data comprises:
performing an exclusive nor (XNOR) operation on the data obtained from the first strobe read and the second strobe read.

17. The non-transitory computer-readable storage medium of claim 15, wherein the processing device is to perform operations further comprising:
storing the semi-soft bit data in a latch of a page buffer corresponding to the target cell.

18. The non-transitory computer-readable storage medium of claim 15, wherein the processing device is to perform operations further comprising:
based on the respective cell state information of the respective group of adjacent cells, storing, in a latch associated with the target cell, hard bit data obtained from the first strobe read.

19. The non-transitory computer-readable storage medium of claim 15, wherein the processing device is to perform operations further comprising:
selecting the first strobe read and the second strobe read for generating the semi-soft bit data based on the respective cell state information of the respective group of adjacent cells.

20. The non-transitory computer-readable storage medium of claim 15, wherein the processing device is to perform operations further comprising:
reserving, in a page buffer of the target cell, a first latch to store the respective cell state information of the respective group of adjacent cells;
reserving, in the page buffer, a second latch to store hard bit data obtained from a strobe read of the set of strobe reads; and
reserving, in the page buffer, at least one additional latch to store the semi-soft bit data.

* * * * *